United States Patent
Stride et al.

(10) Patent No.: US 6,792,422 B1
(45) Date of Patent: Sep. 14, 2004

(54) AUTOMATIC CATEGORIZATION OF FINANCIAL TRANSACTIONS

(75) Inventors: Jeffrey Z. Stride, Bothell, WA (US); Christian R. Lehew, Redmond, WA (US); Eric W. Doerr, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 09/596,637

(22) Filed: Jun. 19, 2000

(51) Int. Cl.[7] ............................................. G06F 17/30
(52) U.S. Cl. ............................... 707/6; 707/3; 707/102; 705/35
(58) Field of Search .............................. 707/102, 3, 6; 705/35, 1, 33

(56) References Cited

U.S. PATENT DOCUMENTS

| | | | | |
|---|---|---|---|---|
| 5,559,313 A | * | 9/1996 | Claus et al. | 235/380 |
| 5,748,908 A | * | 5/1998 | Yu | 705/44 |
| 5,781,897 A | * | 7/1998 | Chen et al. | 707/3 |
| 5,842,185 A | * | 11/1998 | Chancey et al. | 705/35 |
| 5,903,881 A | * | 5/1999 | Schrader et al. | 235/379 |
| 5,920,848 A | * | 7/1999 | Schutzer et al. | 705/33 |
| 6,208,993 B1 | * | 3/2001 | Shadmon | 707/102 |
| 6,401,073 B1 | * | 6/2002 | Tokuda et al. | 705/1 |
| 6,430,539 B1 | * | 8/2002 | Lazarus et al. | 705/10 |

* cited by examiner

*Primary Examiner*—Wayne Amsbury
*Assistant Examiner*—CamLinh Nguyen
(74) *Attorney, Agent, or Firm*—Banner & Witcoff, Ltd.

(57) ABSTRACT

Automatic categorization of a financial transaction based upon a mapping of useful characters from the transaction's description to a financial category. The description of the financial transaction is parsed to identify one or more useful strings of characters. A data file of business names is then searched for a match with the parsed string or strings from the transaction description. The data file is optimized to minimize both lookup times and the size of the data file by representing business-name-to-financial-category mappings using a serialized trie accessed via a memory mapped file. Nodes of the trie having children but no siblings are compressed into dangling nodes. A table of shared suffixes is also used. If a match is found in the business name data file, then the transaction is categorized according to the corresponding business name to financial category mapping. Otherwise, the transaction may be categorized based upon a match found in a database of financial transaction description keywords.

31 Claims, 6 Drawing Sheets

FIG. 1 (PRIOR ART)

| Transaction Date | Reference | Merchant Name or Transaction Description | New Purchases |
|---|---|---|---|
| 3/14 | 0814805226C16 | CBH DENTAL CLINIC | 58.00 |
| 3/23 | 0802500580C25 | MOBIL OIL 01411511 | 11.00 |
| 5/25 | 0811702071E27 | MICHAEL JORDAN GOLF CT | 12.00 |
| 3/22 | 0807101334C24 | PANCAKE CAFÉ | 33.46 |
| 6/13 | 0831201431F15 | PIZZERIA UNO #766 | 37.26 |
| 6/14 | 0811302724F16 | AMERICAN MATTRESS | 2,028.25 |
| 6/20 | 0811604559F22 | CALIFORNIA CAFÉ #17 | 31.50 |

AUTOMATIC CATEGORIZATION OF FINANCIAL TRANSACTIONS

TECHNICAL FIELD

This invention relates generally to financial transaction tracking software. More particularly, the invention provides techniques for automatically categorizing a financial transaction by examining the alphanumeric characters describing the transaction and mapping useful characters from the description to a financial category for the transaction.

BACKGROUND OF THE INVENTION

Figure 3:
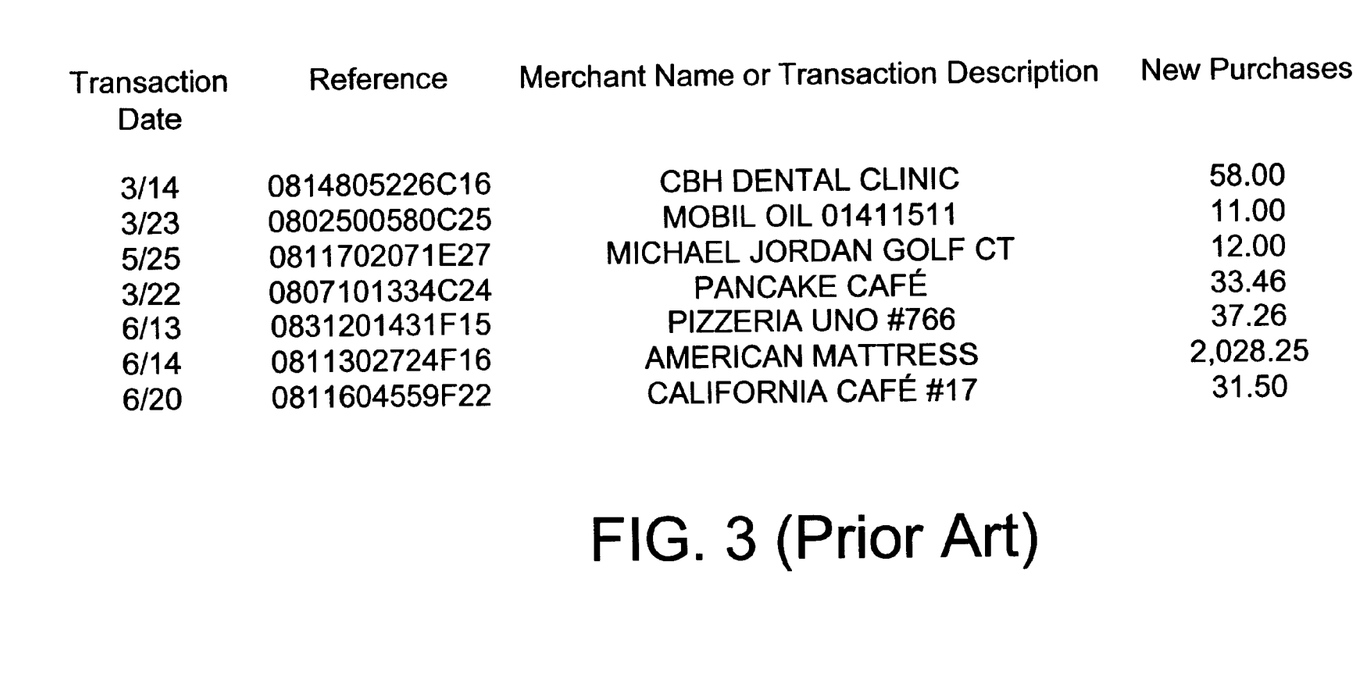
FIG. 3 shows sample financial transaction data taken from actual credit card account statements.

Electronic representations of financial transactions often contain a string of alphanumeric characters that describe the transaction. For instance, FIG. 3 depicts sample transactions as they typically appear on a person's monthly credit card account statement. The data contained in FIG. 3 was taken from actual credit card account statements.

A useful feature of financial transaction tracking software, such as Microsoft Money 2000, is that reports may be generated, spending habits may be analyzed, and compliance with budgets may be reviewed once a person's, family's, or business's expenditures have been categorized. Conventionally, it has been necessary to manually enter categories for each transaction in order to take advantage of these useful features of financial transaction tracking software. Even for an individual or family with relatively few such transactions to categorize, this is an extremely time-intensive process.

U.S. Pat. No. 5,842,185 issued to Chancey et al. purports to use data such as that shown in the column labeled "Reference" in FIG. 3 to automatically categorize financial transactions. Chancey et al. discloses translation of a numeric code, such as a Standard Industry Code (SIC), contained within a financial statement into a financial category for the transaction. The SIC code for restaurants, for instance, is 5812. As can be determined by a review of the three actual financial transaction descriptions listed in FIG. 3 for transactions in restaurants, namely, PANCAKE CAFÉ, PIZZERIA UNO #766, and CALIFORINIA CAFÉ #17, none of these descriptions contain the numeric string "5812", the SIC code for restaurants. Further, none of these descriptions contain any discernible numeric pattern in common with each other that is specific to only these restaurant-related entries in FIG. 3.

Accordingly, there is a need for improved techniques of automatically assigning a financial category based upon an electronic representation of a financial transaction. Of course, such a technique should execute as quickly as possible for several reasons. For instance, while a user of financial transaction tracking software is entering transactions, if the technique results in a perceptible delay, users will tend to be annoyed and dissatisfied. In addition, run-time efficiency is extremely important for a financial institution, which may have a very large number of transactions to automatically categorize for any given time period. In addition, for financial transaction tracking software shipped on a CD-ROM or delivered in some other manner in which the size of any data files used for automatically categorizing financial transactions is a concern, techniques that minimize the size of any necessary data files are desirable.

Conventionally, data has not been available that would allow automatic categorization of substantially all financial transactions without producing unduly long run-time delays and without requiring unduly large files of data.

SUMMARY OF THE INVENTION

The present invention provides techniques for automatically categorizing a financial transaction by examining the alphanumeric characters describing the transaction and assigning a financial category to the transaction based upon a mapping of the useful characters from the transaction description to a financial category. Automatically assigning categories to transactions eliminates the need for the extremely time-intensive process of manually categorizing such transactions so that financial transaction tracking software can perform analysis and generate reports that take advantage of having a user's transactions categorized.

According to one variation of the invention, the description of the financial transaction is parsed to identify one or more useful strings of characters. A data file of business names is then searched for a match with the parsed string or strings from the transaction description. The data file is preferably optimized to minimize data redundancy, which minimizes both lookup times and the size of the data file. In this regard, a serialized trie may be used to represent business-name-to-financial-category mappings. Further optimization may be achieved by accessing the data file via a memory-mapped file, by compressing strings of nodes having children but no siblings into dangling nodes, and by including a table of shared suffixes.

If a match is found in the business name data file, then the transaction is categorized according to the corresponding business-name-to-financial-category mapping. Otherwise, a search of a keyword database may be performed. If a financial description keyword match is found, then a category may be assigned to the transaction based upon a keyword-to-category mapping corresponding to the matching keyword. Various strategies may be used for resolving situations in which more than one keyword match is found. For instance, keywords may be assigned relative priorities in advance, or the relative placement of keywords in the transaction description may determine which keyword match is used for assigning a category to the transaction.

Other features and advantages of the invention will become apparent through the following description, the figures, and the appended claims.

DETAILED DESCRIPTION OF THE INVENTION

Figure 1:
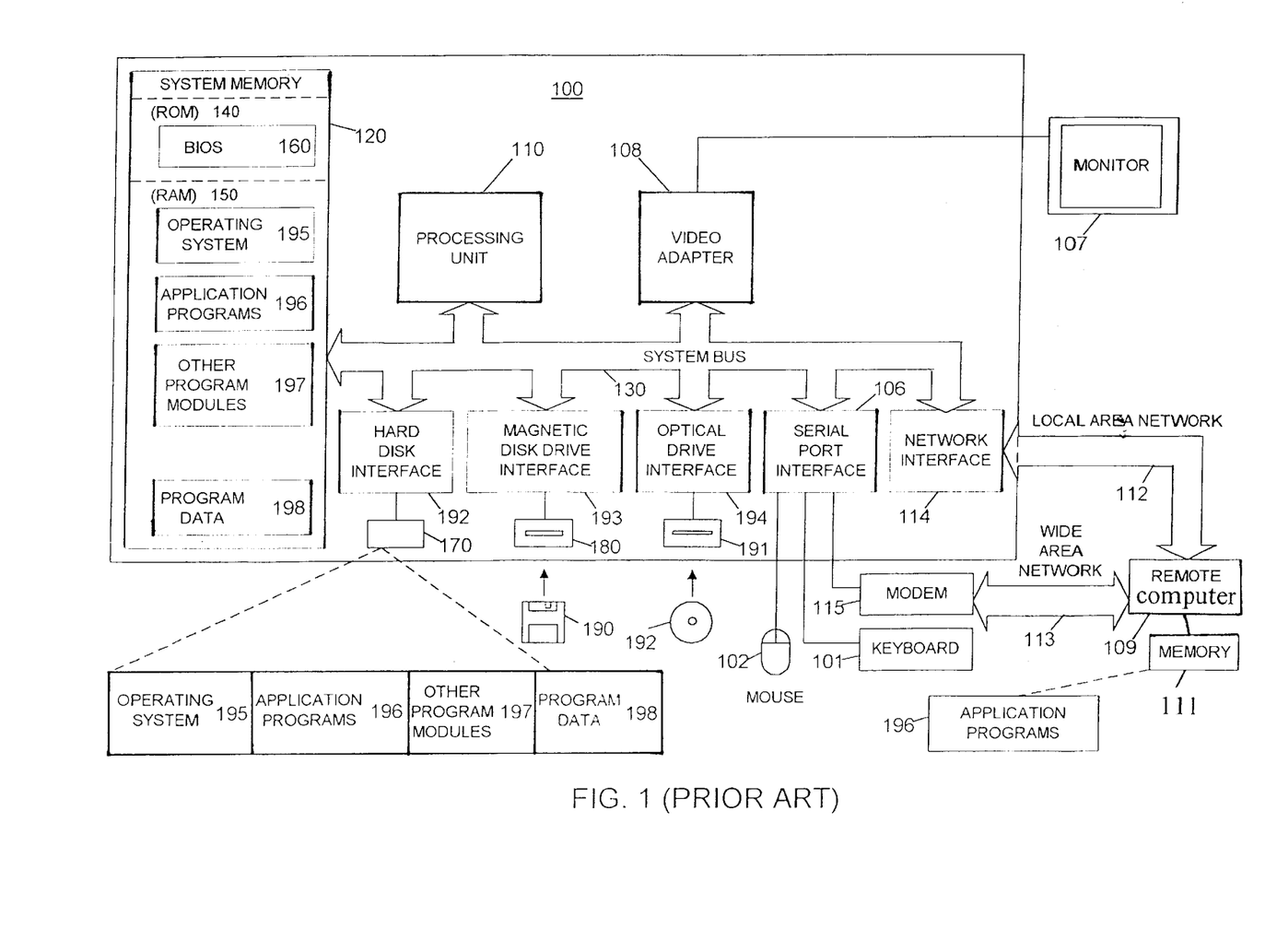
FIG. 1 shows a conventional general-purpose computing environment in which various embodiments of the invention may be implemented.

FIG. 1 is a schematic diagram of a conventional general-purpose digital computing environment that can be used to implement various aspects of the invention. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
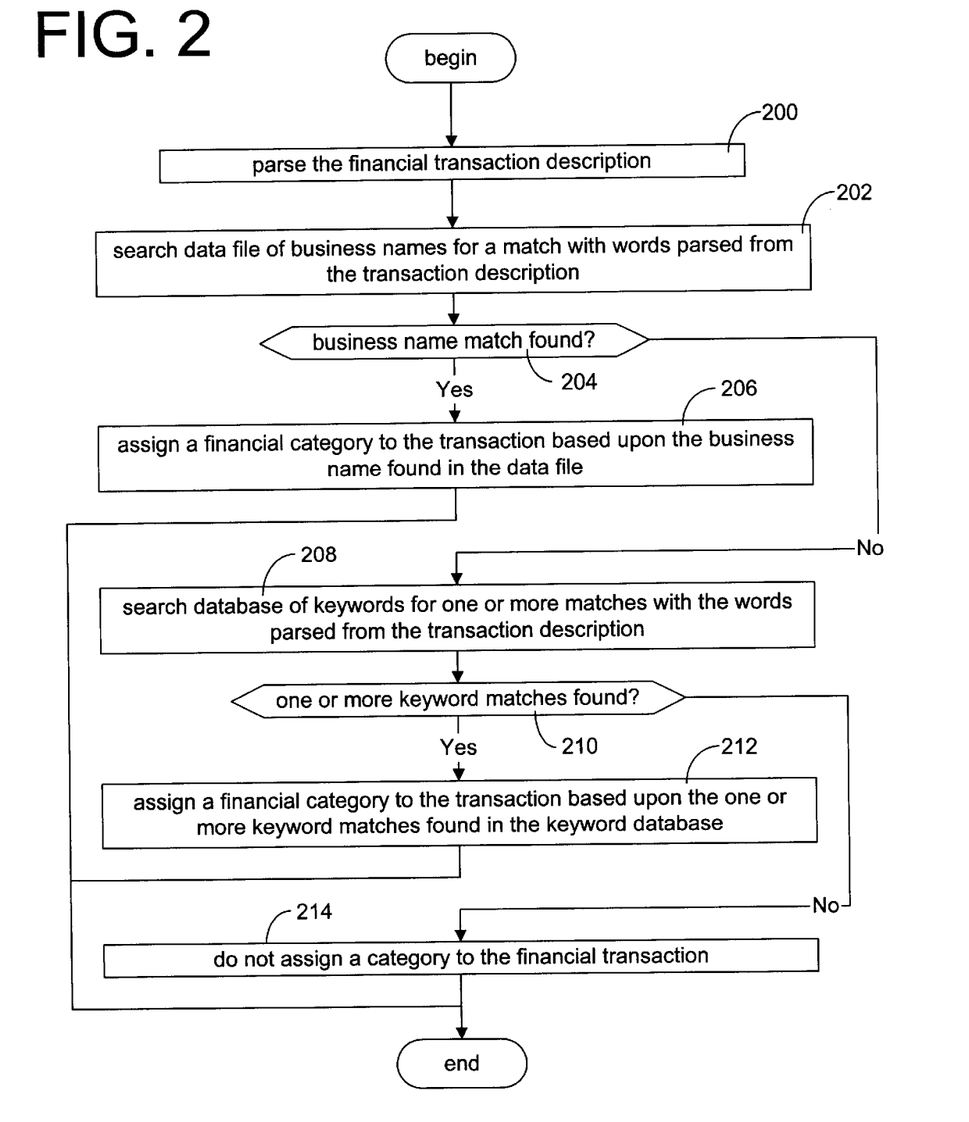
FIG. 2 shows a flowchart indicating various steps that may be executed to automatically categorize a financial transaction according to certain inventive principles.

FIG. 2 is a simplified flow chart depicting steps for automatically categorizing financial transactions in accordance with various aspects of the invention. The description of a financial transaction is parsed, at step 200. As used herein, the phrases such as "description of a financial transaction" and variants thereof refer to alphanumeric characters such as those shown in the column labeled "Merchant Name or Transaction Description" in FIG. 3. Parsing of the financial transaction description is performed in any suitable manner, many of which are well know in the art, in order to separate useful characters from characters in the financial description that will not be useful in assigning a category to the financial transaction. Parsing will typically result in one or more strings suitable for use in searching a database of financial transaction description keywords or for use in searching a data file of business names. Parsing may also include removal of superfluous characters such as punctuation marks and words such as "the" from the financial transaction description.

As depicted at step 202, the parsed description of the financial transaction may be used to search for a matching entry in a data file. In a preferred embodiment of the invention, the data file is preferably optimized to minimize both the data file search times and size.

Figure 4:
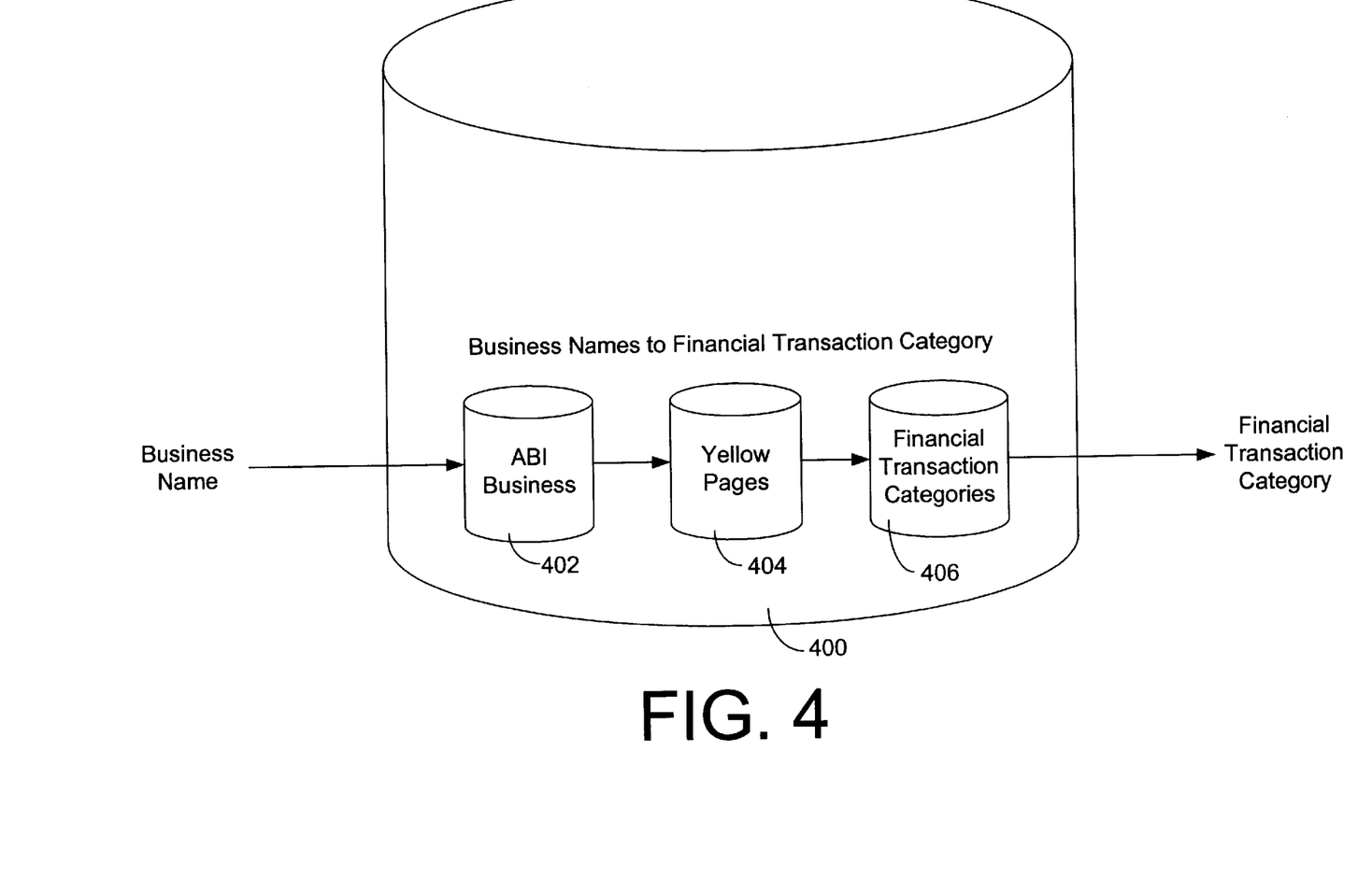
FIG. 4 shows potential mappings from a business name to a financial transaction category.

FIG. 4 schematically depicts databases 402, 404, and 406, which symbolize successive mappings that comprise business name to financial transaction category database 400. ABI business database 402 maps the names of substantially every business in the United States to its corresponding SIC code. SIC codes specify the type of business conducted by a particular business entity. For instance, restaurants are assigned an SIC code of 5812. Yellow pages database 404 symbolizes a mapping of SIC codes to yellow pages categories. Financial transaction categories database 406 symbolizes a mapping from yellow pages categories to financial transaction categories. As will be appreciated, yellow pages categories database 406 may be circumvented by mapping SIC codes directly to financial transaction categories.

Figure 5:
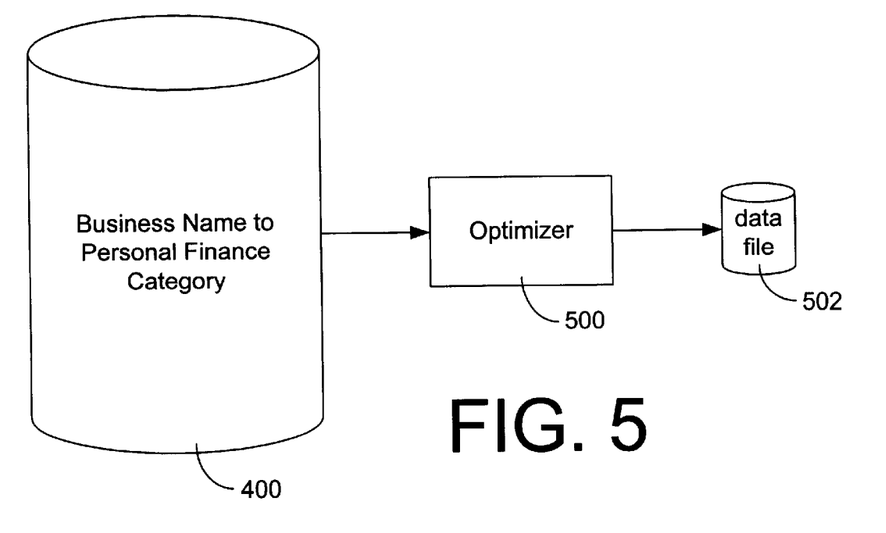
FIG. 5 symbolically shows optimization of a database of business names into a data file.

FIG. 5 schematically depicts optimization of business-name-to-financial-transaction-category database 400, by optimizer 500, which results in business name data file 502. According to a preferred embodiment of the invention, data file 502 is optimized by representing business-name-to-financial-transaction-category database 400 as a serialized trie with shared suffixes and truncated nodes. As will be appreciated, other suitable optimization techniques or compression techniques or both may also be used. For instance, the list of businesses included in data file 502 may be reduced by filtering such that businesses having any or all of the following characteristics are excluded from data file 502: not having a location in more than one city, not having a location in more than one zip code, or mapping to a financial category of "miscellaneous."

Figure 6:
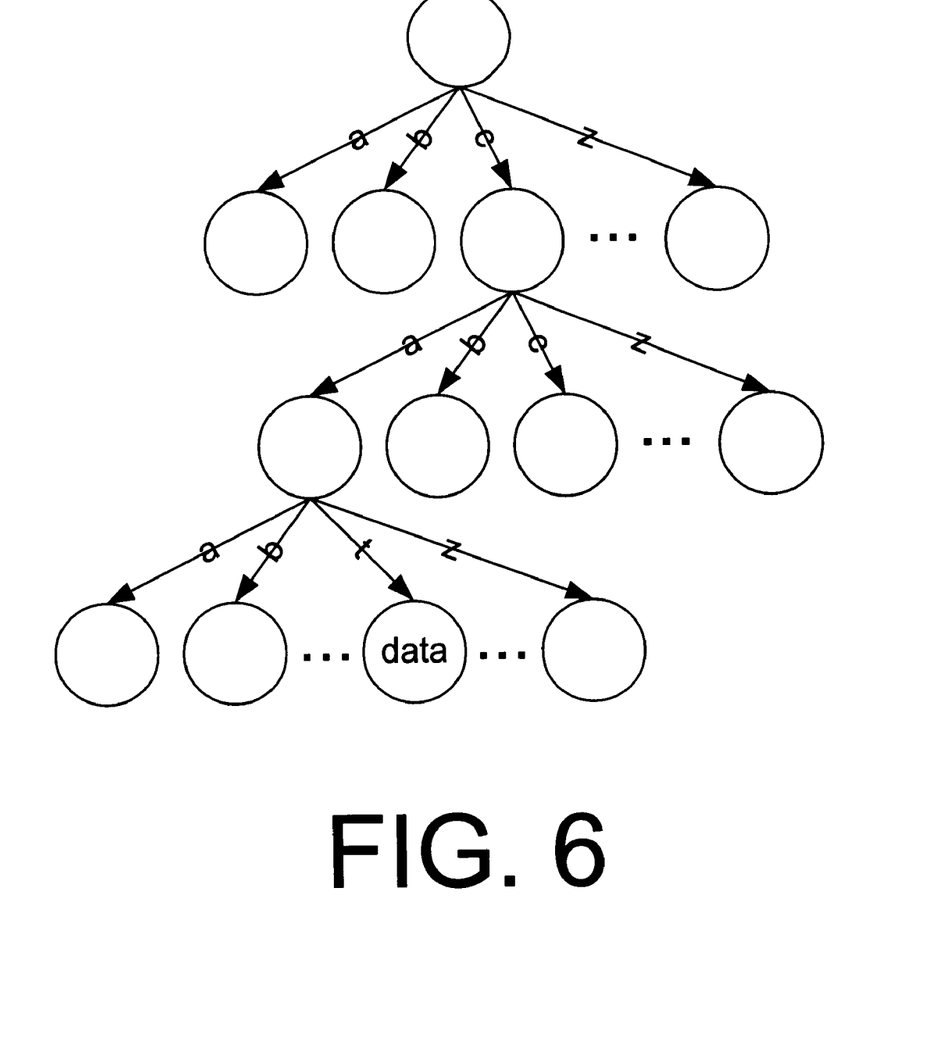
FIG. 6 shows a portion of a trie.

FIG. 6 depicts the concept of a trie and shows data stored for the string "cat". In order to optimize the amount of time needed to search data file 502 for a particular business name, data file 502 may be serialized, a technique that allows nodes normally referenced by memory addresses to be addressed by their respective offsets from the start of the serialization. This allows for the trie to be saved to a file and mapped into memory thereby minimizing the amount of information that needs to be in physical memory at any one time. When serializing the trie, sibling nodes are clustered together thereby shortening trie search times by promoting locality which reduces the frequency of page swapping.

Data, such as a business-name-to-financial-transaction-category mapping, may be stored in either an internal node or a leaf node. Paths in data file 502 often have similar suffixes. Accordingly, data file 502 preferably includes a table of shared suffixes such that nodes sharing a common suffix point to the shared suffix in the shared suffix table. The nodes themselves contain the data, which may vary, for each node.

Pointers to nodes are preferably represented as offsets from the start of the serialized trie of data file 502. Data file 502 is preferably accessed via a mapped memory file eliminating inefficiencies associated with loading and processing entire data file 502. Virtually all searches in data file 502 will result in no more memory pages being swapped than the length of the lookup key string. The number of page swaps is also reduced by shared suffixes and dangling nodes, which were described above. The size of data file 502 may be reduced by excluding businesses having only one location in the United States.

Referring to FIG. 2 again, if a match is found for one or more of the strings resulting from parsing step 200, a financial category is assigned to the transaction, as depicted in steps 204 and 206. As depicted in steps 204 and 208, if a match is not found in data file 502, a database of financial transaction keywords is searched for one or more matches with the string or strings parsed from the transaction description. If a match is in the keyword database, a financial category is assigned to the transaction, as depicted in steps 210 and 212. Otherwise, if no match is found in the data file of business names and no match is found in the keyword database, then no category is assigned to the financial description, as depicted in steps 210 and 214.

To explain how the steps set forth in FIG. 2 may process financial transaction descriptions and assign appropriate financial categories to the transactions, an explanation will be provided for how the example transactions in FIG. 3 may, preferably, be handled by the steps in FIG. 2.

Referring to FIGS. 2 and 3, assuming the CBH DENTAL CLINIC transaction refers to a dental appointment at a dentist's only office and that data file 502 has been optimized such that, among other things, businesses having only one location have been excluded from data file 502, a match may not be found in business name data file 502. DENTAL, however, would likely match a keyword in the financial transaction keyword database, and an appropriate personal finance category, such as "healthcare:dental" may be assigned to this transaction.

The numeric characters in the next transaction of FIG. 3, MOBIL OIL 01411511, would preferably be removed by parsing step 200, a match in business name data file 502 would preferably be found for MOBIL, and a personal finance category such as "automobile expenses:gasoline" may be assigned to the transaction.

The next transaction in FIG. 3, MICHAEL JORDAN GOLF CT, would preferably be handled in the manner described above for CBH DENTAL CLINIC, with a category such as "leisure:sporting events" being assigned to this transaction based upon a keyword match for GOLF. The next transaction, PANCAKE CAFÉ, would preferably be processed in a similar manner resulting in a category such as "food:dining out" being assigned based upon a keyword match for CAFÉ.

The next transaction, PIZZERIA UNO #766, would preferably be assigned a category such as "food:dining out" based upon a match in the business name data file. The last transaction, CALIFORNIA CAFÉ #17, would preferably be assigned the same such category also based upon a match in the business name data file. Similarly, the second to last entry, AMERICAN MATTRESS, would preferably be assigned a category such as "household:furnishings" based upon a match in the business name data file. Unlike the examples in previous paragraphs, the examples in this paragraph assume that, because the businesses in the examples of this paragraph have multiple locations in multiple cities, the business names in the examples of this paragraph have not been filtered out of data file 502.

We claim:

1. A method in a computer system of automatically categorizing a financial transaction based upon alphanumeric characters present in a textual description of the transaction, the method comprising the steps of:

identifying at least one string of characters from the transaction description, wherein the at least one string of characters does not represent a numeric code;

searching a data file of string-to-financial category mappings for at least one entry that matches the at least one string; and upon finding at least one data file entry that matches the at least one string, assigning a category to the transaction based upon the at least one matching data file entry, which maps the identified at least one string of characters from the transaction description to the financial category assigned to the transaction independently of manual assignment of the assigned financial category to a previous transaction corresponding to the at least one matching data file entry.

2. The method of claim 1, further comprising the step of: optimizing the data file by structuring the data file as a serialized trie.

3. The method of claim 2, further comprising the step of: accessing the data file via a memory mapped file.

4. The method of claim 2, further comprising the step of: optimizing the data file by using a set of shared suffixes.

5. The method of claim 2, further comprising the step of: optimizing the data file by compressing nodes having children nodes but no sibling nodes into dangling nodes.

6. The method of claim 1, wherein the step of identifying at least one string of characters from the transaction description comprises the step of: removing superfluous characters from the description of the transaction.

7. A method in a computer system of automatically categorizing a financial transaction based upon alphanumeric characters present in a textual description of the transaction, the method comprising the steps of:

identifying at least one string of characters from the transaction description, wherein the at least one string of characters does not represent a numeric code;

searching a database of keywords for at least one match with the at least one string; and upon finding a keyword in the keyword database that matches the at least one string, assigning a category to the transaction based upon a keyword-to-financial-category mapping corresponding to the matching keyword, which maps the identified at least one string of characters from the transaction description to the financial category assigned to the transaction independently of manual assignment of the assigned financial category to a previous transaction corresponding to the at least one matching keyword.

8. The method of claim 7, further comprising the step of: removing superfluous characters from the description of the transaction before identifying the at least one string of characters.

9. The method of claim 8, further comprising the step of: upon finding multiple keywords in the keyword database that match the at least one string, assigning a category to the transaction based upon a predetermined strategy for resolving multiple keyword matches.

10. The method of claim 9, further comprising the step of: resolving multiple keyword matches based upon preassigned priorities associated with each matching keyword.

11. The method of claim 9, further comprising the step of: resolving multiple keyword matches based upon relative locations within the transaction description of matching strings.

12. The method of claim 7, further comprising the steps of:
upon not finding a keyword in the keyword database that matches the at least one string:
searching a data file of business names for at least one entry that matches the at least one string, and
upon finding a business name in the business name data file that matches the at least one string, assigning a category to the transaction based upon a business-name-to-financial category mapping corresponding to the matching business name.

13. The method of claim 12, further comprising the step of: optimizing the business name data file by structuring the data file as a serialized trie.

14. The method of claim 13, further comprising the step of: accessing the data file via a memory mapped file.

15. The method of claim 13, further comprising the step of: optimizing the business data file by using a set of shared suffixes.

16. The method of claim 13, further comprising the step of: optimizing the data file by compressing nodes having children nodes but no sibling nodes into dangling nodes.

17. A method in a computer system of automatically categorizing a financial transaction based upon alphanumeric characters present in a description of the transaction and independent of any alphanumeric reference code for the transaction, the method comprising the steps of:
identifying at least one string of characters from the transaction description, wherein the at least one string of characters does not represent a numeric code;
searching a data file of business names for at least one entry that matches the at least one string;
upon finding a business name in the business name data file that matches the at least one string, assigning a category to the transaction based upon a business-name-to-financial category mapping corresponding to the matching business name, which maps the identified at least one string of characters from the transaction description to the financial category assigned to the transaction independently of manual assignment of the assigned financial category to a previous transaction corresponding to the matching business name; and
upon not finding a business name in the business name data file that matches the at least one string:
searching a database of keywords for at least one match with the at least one string, and
upon finding a keyword in the keyword database that matches the at least one string, assigning a category to the transaction based upon a keyword-to-financial-category mapping corresponding to the matching keyword.

18. The method of claim 17, further comprising the step of: optimizing the business name data file by structuring the data file as a serialized trie.

19. The method of claim 18, further comprising the step of: accessing the data file via a memory mapped file.

20. The method of claim 19, further comprising the step of: optimizing the business data file by using a set of shared suffixes.

21. The method of claim 20, further comprising the step of: optimizing the data file by compressing nodes having children nodes but no sibling nodes into dangling nodes.

22. The method of claim 21, further comprising the step of: removing superfluous characters from the description of the transaction before identifying the at least one string of characters.

23. The method of claim 22, further comprising the step of: upon finding multiple keywords in the keyword database that match the at least one string, assigning a category to the transaction based upon a predetermined strategy for resolving multiple keyword matches.

24. The method of claim 23, further comprising the step of: resolving multiple keyword matches based upon preassigned priorities associated with each matching keyword.

25. The method of claim 24, further comprising the step of: resolving multiple keyword matches based upon relative locations within the transaction description of matching strings.

26. A computer-readable medium containing computer-executable instructions for automatically categorizing a financial transaction based upon alphanumeric characters present in a textual description of the transaction by performing steps comprising:
identifying at least one string of characters from the transaction description, wherein the at least one string of characters does not represent a numeric code;
searching a data file of string-to-financial category mappings for at least one entry that matches the at least one string; and
upon finding at least one data file entry that matches the at least one string, assigning a category to the transaction based upon the at least one matching data file entry, which maps the identified at least one string of characters from the transaction description to the financial category assigned to the transaction independently of manual assignment of the assigned financial category to a previous transaction corresponding to the at least one matching data file entry.

27. The computer-readable medium of claim 26, wherein the data file is structured as a serialized trie.

28. The computer-readable medium of claim 27, containing computer-executable instructions for accessing the data file via a memory mapped file.

29. The computer-readable medium of claim 27, wherein the data file includes a set of shared suffixes.

30. The computer-readable medium of claim 27, further comprising the step of: optimizing the data file by compressing nodes having children nodes but no sibling nodes into dangling nodes.

31. The computer-readable medium of claim 26, wherein the step of identifying at least one string of characters from the transaction description comprises the step of removing superfluous characters from the description of the transaction.

* * * * *